United States Patent
Yamaguchi et al.

[11] Patent Number: 6,011,333
[45] Date of Patent: Jan. 4, 2000

[54] VIBRATOR MOTOR HAVING NONMAGNETIC ARMATURE CORES

[75] Inventors: Tadao Yamaguchi, Isesaki; Koichi Nakajima, Tamamura; Toru Arai, Isesaki, all of Japan

[73] Assignee: Tokyo Parts Industrial Co., Ltd., Isesaki, Japan

[21] Appl. No.: 09/298,227

[22] Filed: Apr. 22, 1999

[51] Int. Cl.[7] .................................................. H02K 7/06
[52] U.S. Cl. .................................. 310/81; 310/40 MM
[58] Field of Search .......................... 310/81, 40 MM, 310/261, 264, 267; 601/60, 67, 70; 340/384.73, 311.1, 825.46

[56] References Cited

U.S. PATENT DOCUMENTS

| | | | |
|---|---|---|---|
| 4,468,579 | 8/1984 | Suzuki | 310/208 |
| 5,036,239 | 7/1991 | Yamaguchi | 310/268 |
| 5,107,155 | 4/1992 | Yamaguchi | 310/81 |
| 5,327,035 | 7/1994 | Sunaga | 310/81 |
| 5,341,057 | 8/1994 | Yamaguchi et al. | 310/81 |
| 5,373,207 | 12/1994 | Yamaguchi et al. | 310/81 |
| 5,471,103 | 11/1995 | Fujii | 310/81 |
| 5,889,349 | 3/1999 | Yasuda | 310/261 |
| 5,903,076 | 5/1999 | Suyama | 310/81 |

*Primary Examiner*—Nestor Ramirez
*Assistant Examiner*—Dang Dinh Le
*Attorney, Agent, or Firm*—Kenjiro Hidaka

[57] ABSTRACT

A vibrator motor has a generally sector-shaped eccentric armature rotor that has a nonmagnetic body including core parts, around which armature coils are individually wound. The core parts are disposed at an even pitch angle, but within a 180° angular range, about the rotational axis of the rotor. A rotor body of one embodiment consists of a first part and a second part that includes the core parts and the first part is made of a synthetic resin and the second part is made of a synthetic resin or a nonmagnetic but electrically-conductive metal. A rotor of an additional embodiment has a single-piece body of a synthetic resin that integrally has the core parts.

14 Claims, 10 Drawing Sheets

VIBRATOR MOTOR HAVING NONMAGNETIC ARMATURE CORES

BACKGROUND OF THE INVENTION

1. Field of the Invention

This invention relates to a self-vibrating dc-operated vibrator motor used for a pocketable wireless alerting or communication device such as a pager or a portable phone. The motor has an eccentric armature rotor for creating vibration.

2. Description of the Prior Art

FIG. 10 shows a typical prior known dc vibrator motor. In FIG. 10, a cylindrical coreless dc vibrator motor MG has an output shaft S6 on which an eccentric weight W, made of a tungsten alloy etc., is fixedly mounted. The motor vibrates as the shaft S6 rotates because of the unbalanced distribution of the mass about the rotational axis.

However, some danger of mechanical interference pertains to this type of vibrator motor since the rotating eccentric weight is located outside the motor case. In addition, the alerting device requires an extra space in which the eccentric weight turns, and the high density material, such as tungsten alloy, for the eccentric weight is costly.

As disclosed in U.S. Pat. No. 5,036,239 (issued Jul. 30, 1991, one of the present applicants invented a flat coreless dc vibrator motor having neither output shaft nor external weight. This motor has a rotor which incorporates generally sector shaped non-overlapping flat armature coils arranged angularly partially about the shaft of the rotor, so that the center of mass of the rotor is off the rotational axis of the rotor.

As disclosed in U.S. Pat. No. 5,107,155 (issued Apr. 21, 1992), the same applicant invented a dc vibrator motor having neither output shaft nor external weight. This motor has a fixed shaft on which a cylindrical magnet is fixedly mounted, and an eccentrically-weighted rotor having a cylindrical coreless windings, enclosing the fixed magnet, is mounted on the fixed shaft. The rotor has either eccentric bearings or a combination of eccentric bearings and eccentric weights, so that the center of mass of the rotor is off its rotational axis. Although the motor has been favorably accepted in the market, the rotor of this motor requires additional production steps.

As disclosed in U.S. Pat. No. 5,341,057 (issued Aug. 23, 1994), two out of the present applicants jointly invented an additional dc vibrator motor having neither output shaft nor external weight. This motor has an eccentric armature rotor having three-pole armature iron cores and coils that are all situated within an angular range of 180° about its rotational axis.

A sector-shaped eccentric armature rotor having all of the armature poles within an angular range of 180° provides a good mass unbalance. However, the iron armature cores of the motor disclosed in U.S. Pat. No. 5,341,057 causes a cogging torque and requires comparatively high voltage for starting.

SUMMARY OF THE INVENTION

It is therefore a primary object of the present invention to provide a light and compact vibrator motor having an eccentric armature rotor that causes little cogging torque and requires low voltage for actuating the rotor.

In order to achieve the above object, a vibrator motor according to the present invention comprises a housing, a shaft supported by the housing, a toroidal permanent field magnet fixedly disposed in the housing coaxially with the shaft, a generally sector-shaped eccentric armature rotor disposed in the housing and mounted on the shaft, and a pair of resilient commutator brushes of opposite polarities disposed in the housing.

The rotor has an eccentric nonmagnetic body including core parts, a base plate, to which the body is fixed, and a plurality of armature coils that are individually wound around the core parts. The core parts are disposed at an even pitch angle, but within a 180° angular range, about the rotational axis of the rotor.

A rotor body of one embodiment consists of a first part and a second part. The first part integrally has a hub part that engages with the shaft, a generally radially extending first supporting part, a generally axially extending first coil retaining part. The second part integrally has a generally radially extending second supporting part, a generally axially extending second coil retaining part that includes the core parts. The second coil retaining part is interposed radially between the first coil retaining part and the field magnet. The first and the second supporting parts are fixed to the base plate and the coils are disposed sandwiched therebetween. The first part is made of a synthetic resin and the second part is made of the same or a different synthetic resin or a nonmagnetic but electrically-conductive metal. The armature coils are connected in a star connection, and if the second part is made of a nonmagnetic electrically-conductive metal the neutral point of the star connection is short-circuited with the second part.

A rotor body of an additional embodiment consists also of a first part made of a first synthetic resin and a second part made of a second synthetic resin, both of which are fixed to the base plate. The first part has a hub part and generally radially extending supporting part and the second part has a generally radially extending supporting part and a generally axially extending coil retaining part that integrally has core parts and corresponding arcuate coil retaining flanges at radial end of the rotor, and coils are individually wound around the respective core parts radially inside the respective flanges. The field magnet is disposed radially inside the coil retaining part.

A rotor body of a further additional embodiment, made of a molded single-piece synthetic resin, is fixed to the base plate and coils are disposed flush with the outside perimeter of the rotor and partially embedded in the rotor body. The field magnet is disposed radially outside the rotor in this embodiment.

DETAILED DESCRIPTION OF THE PREFERRED EMBODIMENTS

The invention will now be described in detail with reference to the drawings.

Figure 1:
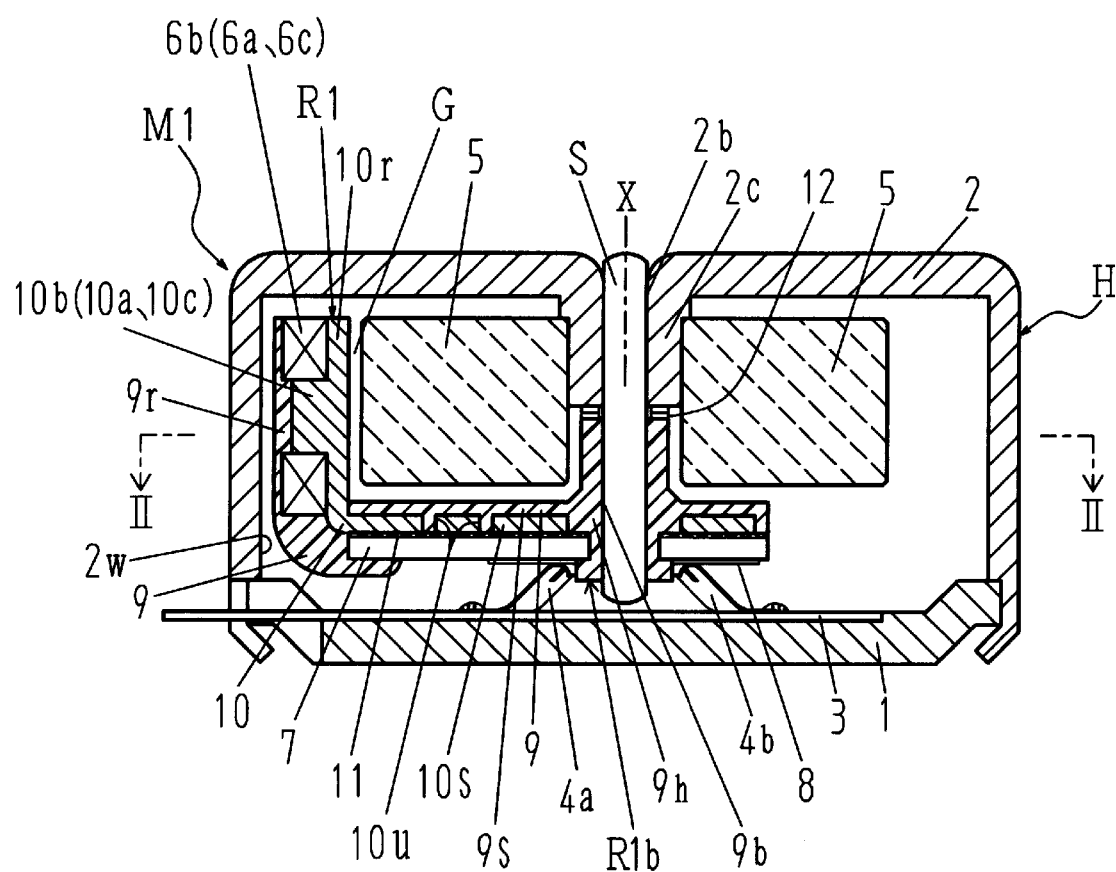
FIG. 1 is a vertical sectional view of a vibrator motor of the first embodiment according to the present invention along the rotational axis of the rotor thereof.

Referring to FIG. 1, a vibrator motor M1 of the first embodiment according to the present invention has a generally cylindrically-shaped housing H that consists of a base 1 and a top case 2 that is fixed to the base 1. The top case 2 has a side circular inside wall 2w and a downwardly and axially drawn part 2c that has an axial center bore 2b. A shaft S is securely press-fitted to the center bore 2b. The center bore 2b and the shaft S have a common longitudinal center axis X. An electrically-insulated wiring board 3 is fixedly mounted on the inside surface of the base 1. A pair of resilient commutator brushes 4a, 4b of opposite polarities are mounted on the wiring board 3.

Figure 3A:
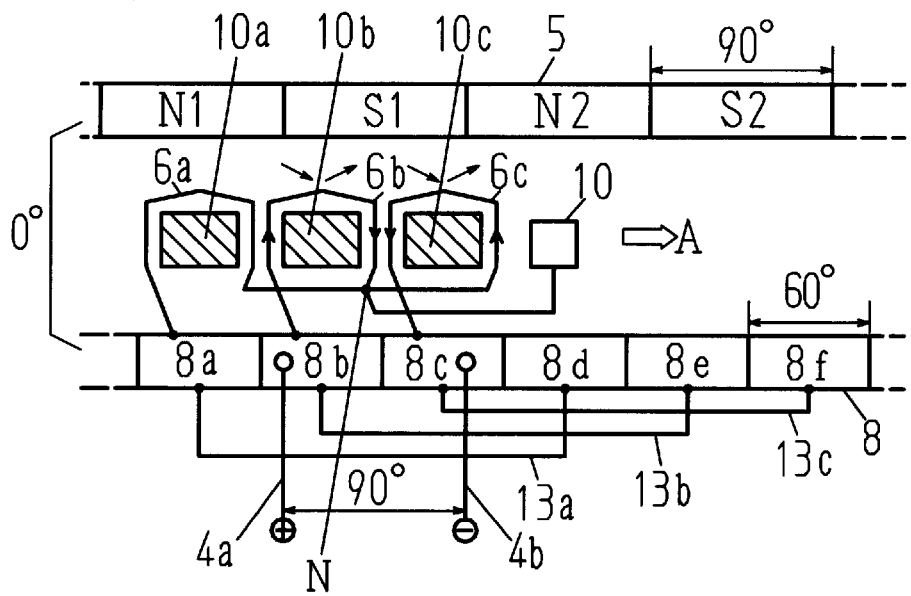
FIGS. 3A and 3B are semi-diagrammatic developed views of arrangements and electrical connections of pertinent components of the vibrator motor shown in FIG. 1.

Referring to FIGS. 1 and 3A, a toroidal permanent field magnet 5 is disposed in the housing H and is fixedly mounted on the downwardly drawn part 2c radially outside thereof and coaxially with the center axis X.

Figure 2:
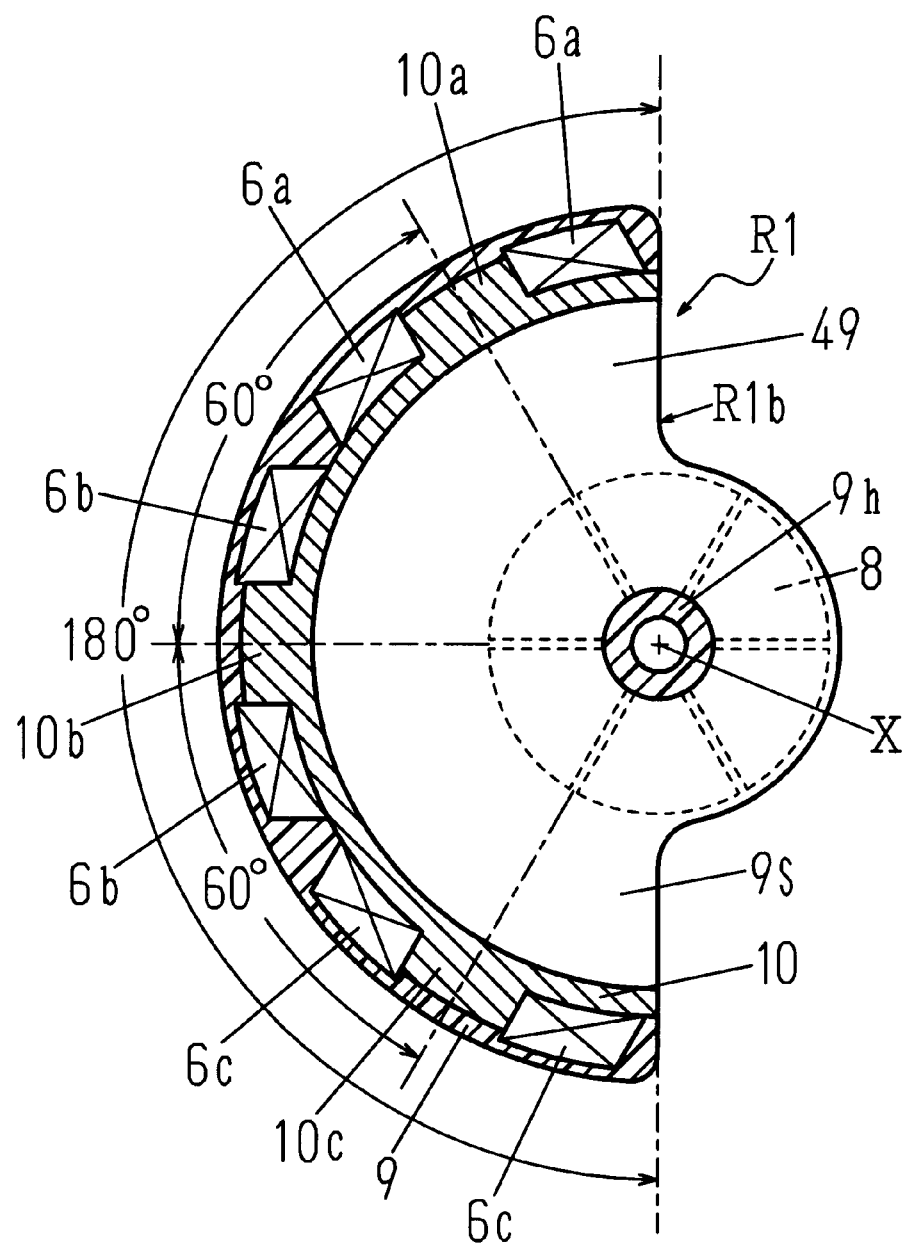
FIG. 2 is a horizontal sectional view of the rotor of the vibrator motor shown in FIG. 1.

Referring to FIGS. 1, 2 and 3A, the vibrator motor M1 has an eccentric armature rotor R1 that is disposed in the housing H and rotatably mounted on the shaft S. FIG. 2 shows a horizontal section of the rotor R1 taken along lines II—II in FIG. 1 without showing any other parts shown in FIG. 1 besides the rotor R1. The rotor R1 has generally a half-cup form and its top view has generally a sectorial form. The rotor R1 has an eccentric body R1b, three armature coils 6a, 6b and 6c, a base plate 7, and a flat ring-shaped comutator 8 fixedly attached to the underside of the base plate 7 coaxially with the center axis X. The coils 6a, 6b and 6c are disposed vertically in parallel with the center axis X at an even pitch angle of 60° about the center axis X.

The body R1b has a first part 9 made of a low-friction type synthetic resin, which is a nonmagnetic material, and a second part 10 made of a brass, which is a nonmagnetic but electrically-conductive metal. The synthetic resin has a density that is less than 1.8, more specifically, in this embodiment, about 1.4.

The first part 9 integrally has a hub part 9h, a generally radially extending first supporting part 9s on radially outside the hub part 9h, and a generally axially extending first coil retaining part 9r on radially outside the supporting part 9s, whereby the first supporting part 9s is disposed between the hub part 9h and the first coil retaining part 9r. The hub part 9h has a mounting bore 9b that accepts therein the shaft S so that the rotor R1 is rotatably mounted on the shaft S. The rotating axis of the rotor R1 naturally coincides with the center axis X. The second part 10 integrally has a generally radially extending second supporting part 10s, which is substantially embedded in the first supporting part 9s of the first part 9, and a generally axially extending second coil retaining part 10r on radially outside the second supporting part 10s. The second supporting part 10s is fixed onto the base plate 7 with an adhesive 11 and parts of the first supporting part 9s are also fixed to the base plate 7 with the adhesive 11 through cutouts 10u in the second supporting part 10s, whereby both the first part 9 and the second part 10 are secured to the base plate 7. The second coil retaining part 10r integrally has three core parts 10a, 10b and 10c and the armature coils 6a, 6b and 6c are individually wound around the core parts 10a, 10b and 10c, respectively. The core parts 10a, 10b and 10c are disposed at an even pitch angle of 60° about the center axis X and within an angular range of 180°.

Referring to FIGS. 1 and 2, the second coil retaining part 10r is disposed radially inside the first coil retaining part 9r and radially outside the field magnet 5 in a manner that the second coil retaining part 10r opposes the field magnet leaving an airgap G therebetween. The coils 6a, 6b and 6c are sandwiched between the first coil retaining part 9r and the second coil retaining part 10r. Numeral 12 denotes slide washers. The resilient commutator brushes 4a and 4b upwardly urge the rotor R1 against the slide washers 12.

Figure 3B:
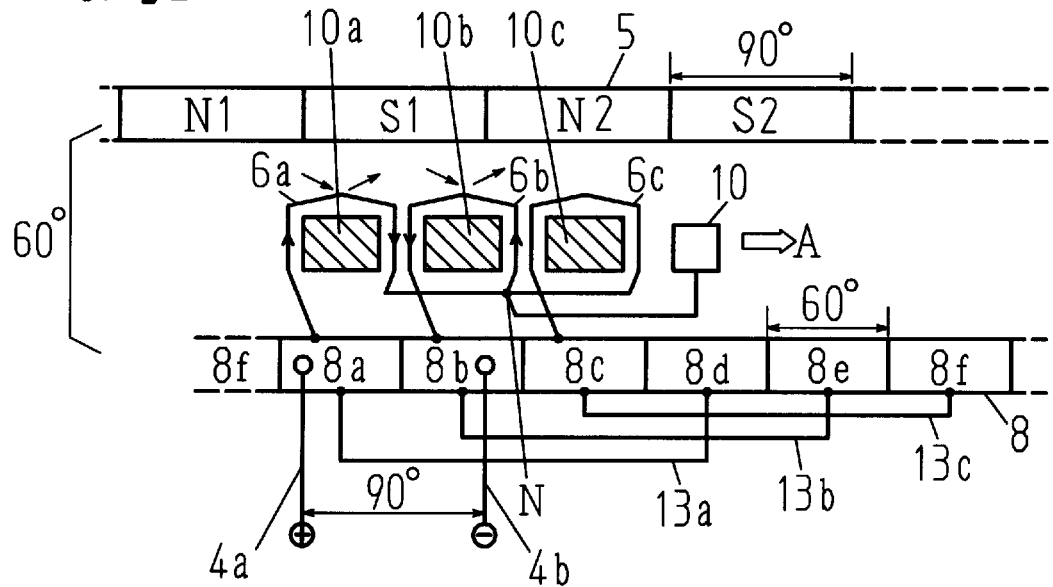

FIGS. 3A and 3B are semi-diagrammatic developed views explanatory of the positional arrangements and electrical connections among the pertinent components of the vibrator motor M1. The same figures are substantially applicable to all other embodiments according to the present invention.

Referring to FIGS. 1 and 3A, the magnet 5 is divided into four arcuate alternate north and south pole sections, N1, S1, N2 and S2, which are disposed coaxially with the center axis X at an even pitch angle of 90°. Although the magnet 5 in the present embodiment is integrally constructed, each pole section thereof may be of a separate segment.

The ring-shaped commutator 8 has six angularly evenly divided arcuate segments 8a, 8b, 8c, 8d, 8e and 8f disposed at an even pitch angle of 60° about the center axis X. The commutator brushes 4a and 4b are arranged in a manner that their respective points that contact with the commutator 8 are positioned at an angle of 90° to each other about the center axis X. The three diametrically opposing pairs of the commutator segments 8a–8d, 8b–8e and 8c–8f are individually short-circuited with each other by connecting conductors 13a, 13b, and 13c, respectively.

Referring to FIGS. 1, 2 and 3A, one end of each of the armature coils 6a, 6b and 6c is electrically connected to a neutral point N that is also electrically connected with the nonmagnetic but electrically-conductive second part 10 of the rotor body R1b and the other ends of the armature coils 6a, 6b and 6c are electrically connected to the commutator segments 8a, 8b and 8c, respectively, so that the armature coils 6a, 6b and 6c form a star (or, "Y") connection as shown in FIG. 3A. It can be said that the second part 10 of the rotor body R1b serves as the electrical neutral point of the star connection.

Referring to FIG. 3A, when the motor M1 is energized with a dc power applied between the commutator brushes 4a and 4b in the polarity shown, electric currents flow through the armature coils 6b and 6c in the directions indicated by the respective arrows. It is assumed, in this case, that the armature coils 6b and 6c are magnetized in north and south polarities, respectively. Consequently, the coil 6b is repelled by the field magnet section N1 and attracted by the section S1. Simultaneously, the coil 6c is repelled by the field magnet section S1 and attracted by the section N2, whereby a torque is produced in the rotor R1 in the direction indicated by arrow A.

In FIG. 3A, it is also assumed that the rotor R1 has a current angular position of 0° with respect to the stationary field magnet 5. In FIG. 3B, it is assumed that the rotor R1 has rotated by 60° from the angular position shown in FIG.

3A. In FIG. 3B, electric currents will flow through the armature coils 6a and 6b in the directions indicated by the respective arrows, and the coils 6a and 6b will be magnetized in north and south polarities, respectively. The coil 6a will, therefore, be repelled by the magnet section N1 and attracted by the section S1. Simultaneously, the coil 6b will be repelled by the magnet section S1 and attracted by the section N2. Accordingly, the torque produced in the rotor R1 will still be in the same direction indicated by arrow A. As the rotor R1 turns further, two out of the three armature coils will be similarly energized so that the torque in the rotor R1 will be produced in a cyclic manner always in the same direction regardless of a current angular position of the rotor R1. The rotor R1, therefore, will maintain its rotation in the same direction as long as the dc power is supplied between the commutator brushes 4a and 4b. Such principle of the rotation of the rotor R1 is a prior known art and is not a novel element in the present invention.

Figure 4:
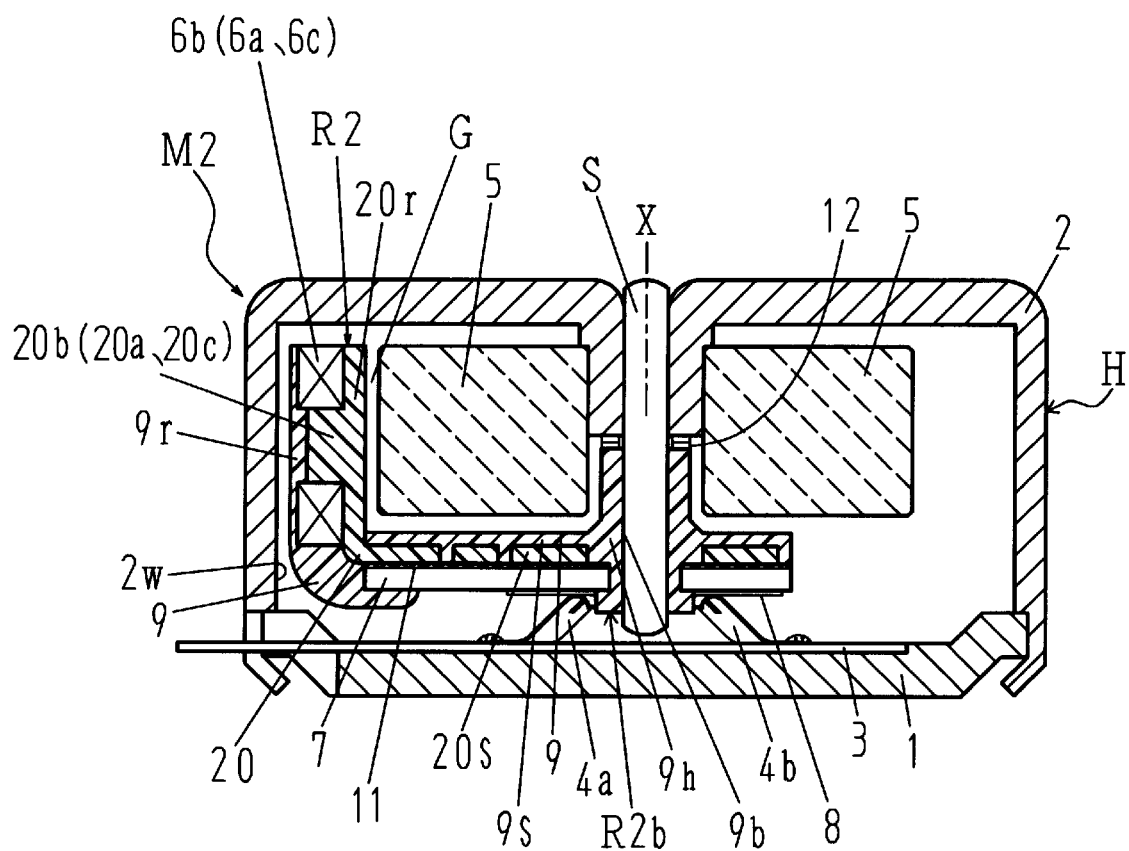
FIG. 4 is a vertical sectional view of a vibrator motor of the second embodiment according to the present invention along the rotational axis of the rotor thereof.

FIG. 4 is a vertical sectional view of a vibrator motor M2 of the second embodiment according to the present invention. The vibrator motor M2 is identical to the vibrator motor M1 of the first embodiment except that the material (i.e. brass) of the second part 10 of the rotor body R1b is changed to a high-density synthetic resin. The vibrator motor M2 shown in FIG. 4, therefore, has a rotor R2 having a rotor body R2b that has a first part 9, which is identical, in form, construction and material, to the first part 9 of the rotor body R1b of the first embodiment, and a second part 20 made of a high-density synthetic resin, which is different from the low-friction type synthetic resin used for the first part 9. The form and construction of the second part 20 are identical to those of the second part 10 of the rotor body R1b of the first embodiment. In the first and the second embodiments, the first part 9 is made of a low-friction type synthetic resin having a density of about 1.4. In the second embodiment, the second part 20 is made of a synthetic resin having a density of about 5.0. More specifically, the second part 20 is made of a high-density hybrid engineering plastic material such as tungsten powder bound with polyamides. Alternatively, the first part 9 of the first and the second embodiments may be made of a synthetic resin having a density less than 1.8 and the second part 20 of the second embodiment may be made of a synthetic resin having a density greater than 3.0.

There is no electrical connection between the neutral point N (FIGS. 3A, 3B) of the coils 6a, 6b and 6c and the second part 20, unlike the case of the first embodiment. These are the only differences of the vibrator motor M2 from those of the vibrator motor M1. All other parts and their functions are identical to each other between the vibrator motors M2 and M1.

As in the case of the first embodiment, the second part 20 integrally has a generally radially extending supporting part 20s, which is fixed to the base plate 7 with the adhesive 11, and a generally axially extending second coil retaining part 20r on radially outside the supporting part 20s which includes three core parts 20a, 20b and 20c that are disposed at a pitch angle of 60° within a 180° angular range about the center axis S as in the case of the core parts 10a, 10b and 10c of the first embodiment. The coils 6a, 6b, 8c are individually wound around the core parts 20a, 20b and 20c, respectively, and are sandwiched between the first and the second coil retaining parts 9r and 20r.

Unless otherwise specifically described, it should be understood throughout this specification and the drawings that like reference numerals or characters denote like components or parts, structurally and functionally. No duplicate explanation will, therefore, be made on the components or parts with reference numerals or characters that are already explained above.

Figure 5:
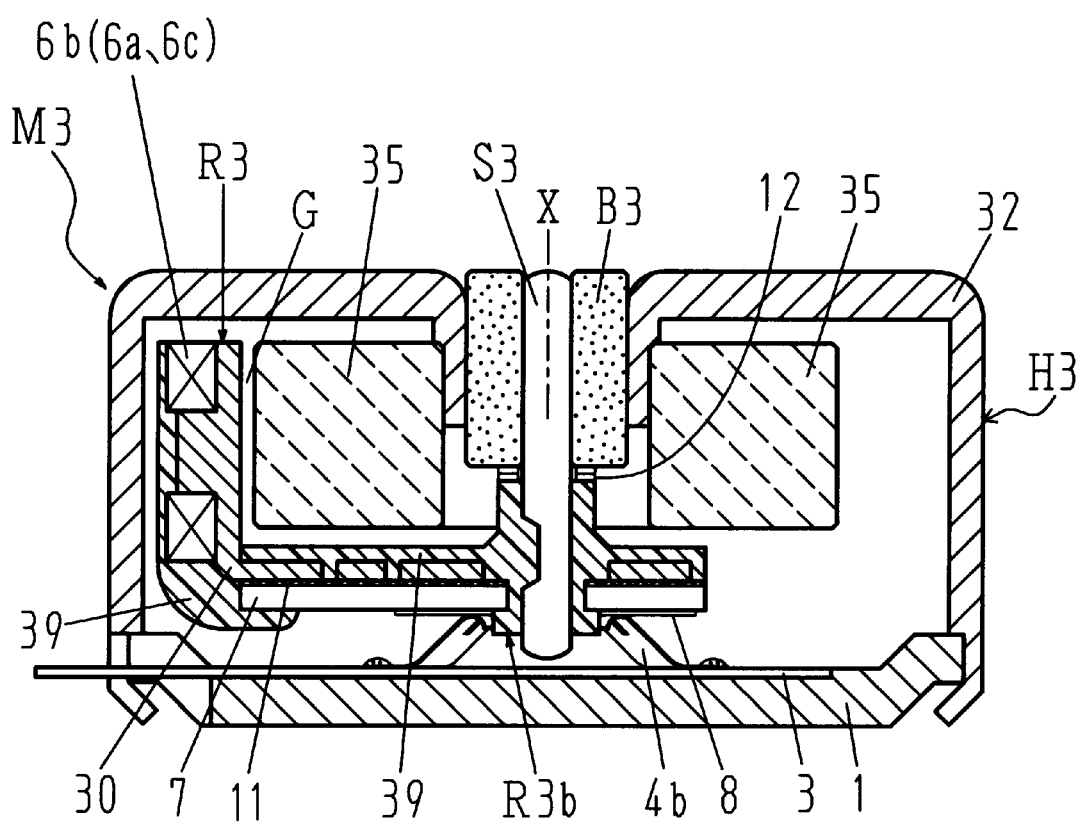
FIG. 5 is a vertical sectional view of a vibrator motor of the third embodiment according to the present invention along the rotational axis of the rotor thereof.

FIG. 5 is a vertical sectional view of a vibrator motor M3 of the third embodiment according to the present invention. The vibrator motor M3 is similar to the vibrator motor M1 or M2 of the first or second embodiment. The vibrator motor M3 has an eccentric rotor R3 including an eccentric rotor body R3b that has a first part 39 and a second part 30. The first part 39 is made of the high-density synthetic resin identical to that of the second part 20 of the second embodiment and is fixed to a keyed shaft S3 that is rotatably supported by an oil-impregnated bearing B3 that is fixed to a top case 32 of a housing H3. The second part 30 is identical, in its form, construction and arrangement, to the second part 10 or 20 of first or second embodiment. The second part 30 is made of the same nonmagnetic electrically-conductive metal as of the second part 10 of the first embodiment, or, alternatively, made of the same high-density synthetic resin as of the first part 39. Namely, in the latter case, the first and the second parts are both made of the identical high-density synthetic resin.

Parts of both the first part 39 and the second part 30 are fixed to the base plate 7 with the adhesive 11, as in the case of the first or second embodiment.

The vibrator motor M3 has a toroidal permanent field magnet 35 fixed to the top case 32 coaxially with the center axis X. The internal diameter of the magnet 35 is greater than that of the magnet 5 of the vibrator motor M1 of the first embodiment because of the presence of the bearing B3. The magnet 35 is also divided into four arcuate alternate north and south pole sections at an even pitch angle of 90° about the center axis X, as in the case of the field magnet 5 of the first embodiment and shown in FIGS. 3A and 3B.

Since all of other parts, components, their arrangements and functions of the vibrator motor M3 are identical to those of the vibrator motors M1 and M2, no further explanation will be made on this embodiment.

Figure 6:
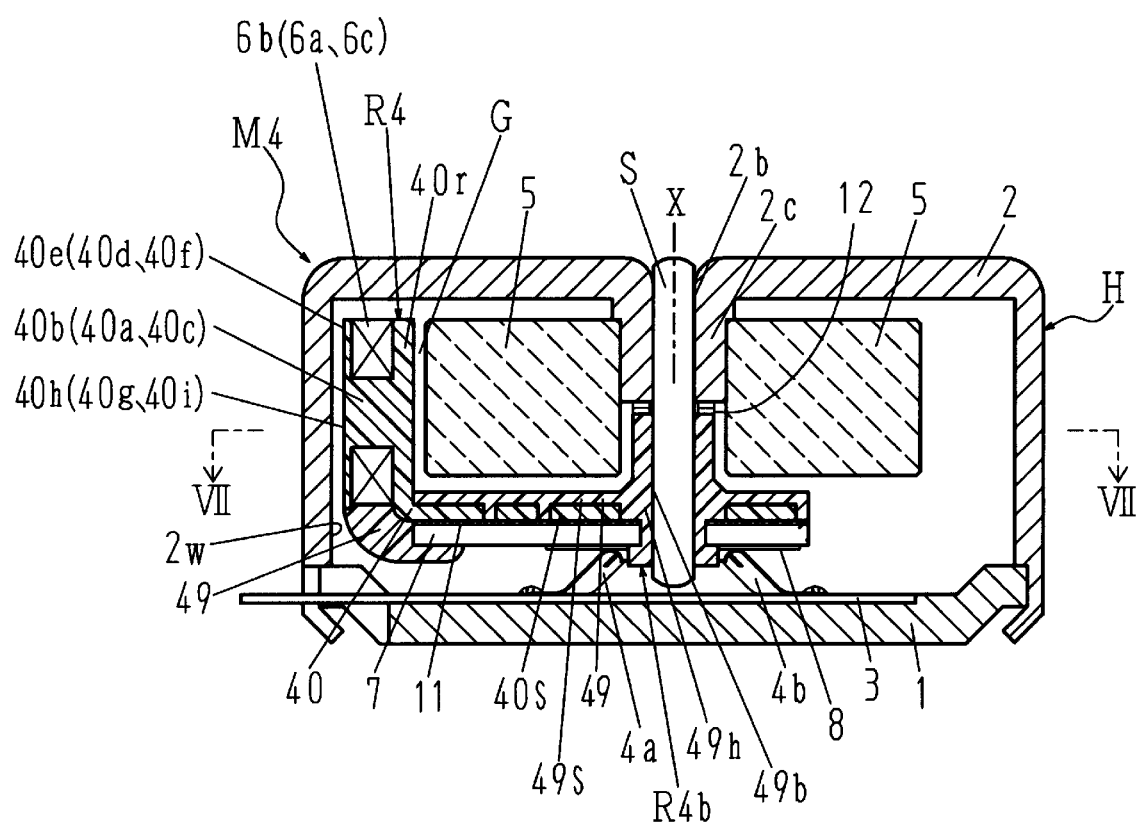
FIG. 6 is a vertical sectional view of a vibrator motor of the fourth embodiment according to the present invention along the rotational axis of the rotor thereof.
Figure 7:
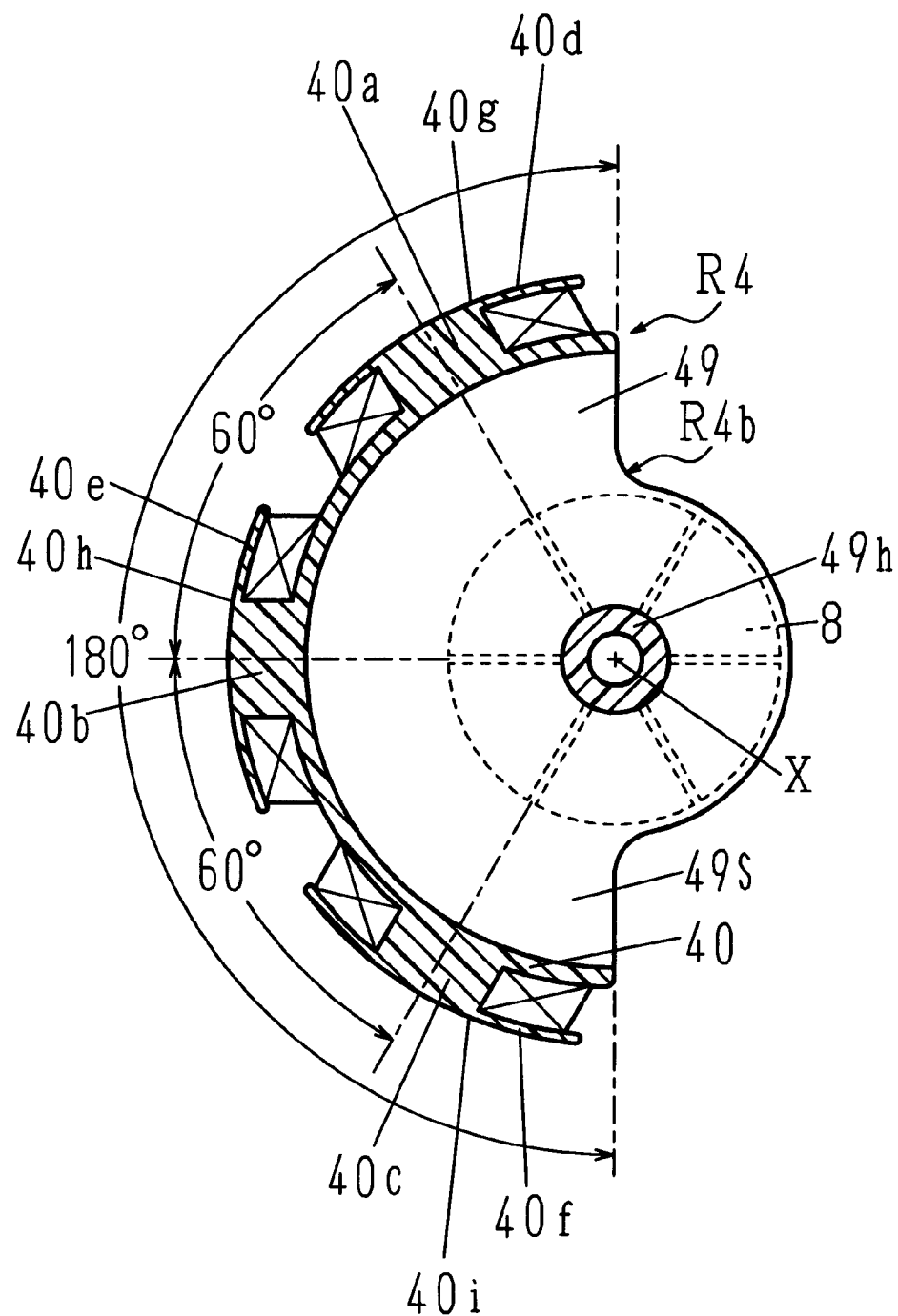
FIG. 7 is a horizontal sectional view of the rotor of the vibrator motor shown in FIG. 6.

FIG. 6 is a vertical sectional view of a vibrator motor M4 of the fourth embodiment according to the present invention. The vibrator motor M4 has an eccentric armature rotor R4 that is disposed in the housing H and rotatably mounted on the shaft S. FIG. 7 shows a horizontal section of the rotor R4 taken along lines VII—VII in FIG. 6 without showing any other parts shown in FIG. 6 besides the rotor R4.

In the fourth embodiment, only the construction of the body of the rotor R4 is different from that of the rotor R2 of the second embodiment and all of the other components thereof are identical to those of the vibrator motor M2.

The rotor R4 has an eccentric body R4b that consists of a first part 49 and a second part 40. The first part 49 is made of the same low-friction type synthetic resin as of the first part 29 of the rotor body R2b of the second embodiment and the second part 40 is made of the same high-density synthetic resin as of the second part 20 of the rotor body R2b.

The first part 49 integrally has a hub part 49h and a first supporting part 49s, which generally radially extends to a radially outermost end of the rotor R4 on radially outside the hub part 49h. The hub part 49h has a mounting bore 49b that accepts therein the shaft S, so that the rotor R4 is rotatable about the center axis X. The second part 40 integrally has a generally radially extending second supporting part 40s, which is substantially embedded in the first supporting part 49s, and a generally axially extending coil retaining part 40r on radially outside the field magnet 5 in a manner that the coil retaining part 40r opposes the field magnet 5 leaving an airgap G therebetween. The coil retaining part 40r integrally has core parts 40a, 40b and 40c and corresponding coil retaining flanges 40d, 40e and 40f at a radially outermost end of the rotor R4 and radially outside the core parts 40a, 40b and 40c, respectively. The flanges 40d, 40e and 40f individually have arcuate surfaces 40g, 40h and 40i, respectively, on radially outside thereof and the surfaces 40g, 40h and 40i oppose the side circular inside wall 2w of the case 2 of the housing H.

The armature coils 6a, 6b and 6c are wound around the core parts 40a, 40b and 40c, respectively, and disposed radially inside the flanges 40d, 40e and 40f, respectively.

The coils 6a, 6b and 6c and the core parts 40a, 40b and 40c are disposed at an even pitch angle of 60° about the center axis X, and the core parts 40a, 40b, and 40c are disposed within a 180° angular range about the center axis X.

Other components and their functions of the vibrator motor M4 are identical to those of the vibrator motor M1 of the first embodiment.

Figure 8:
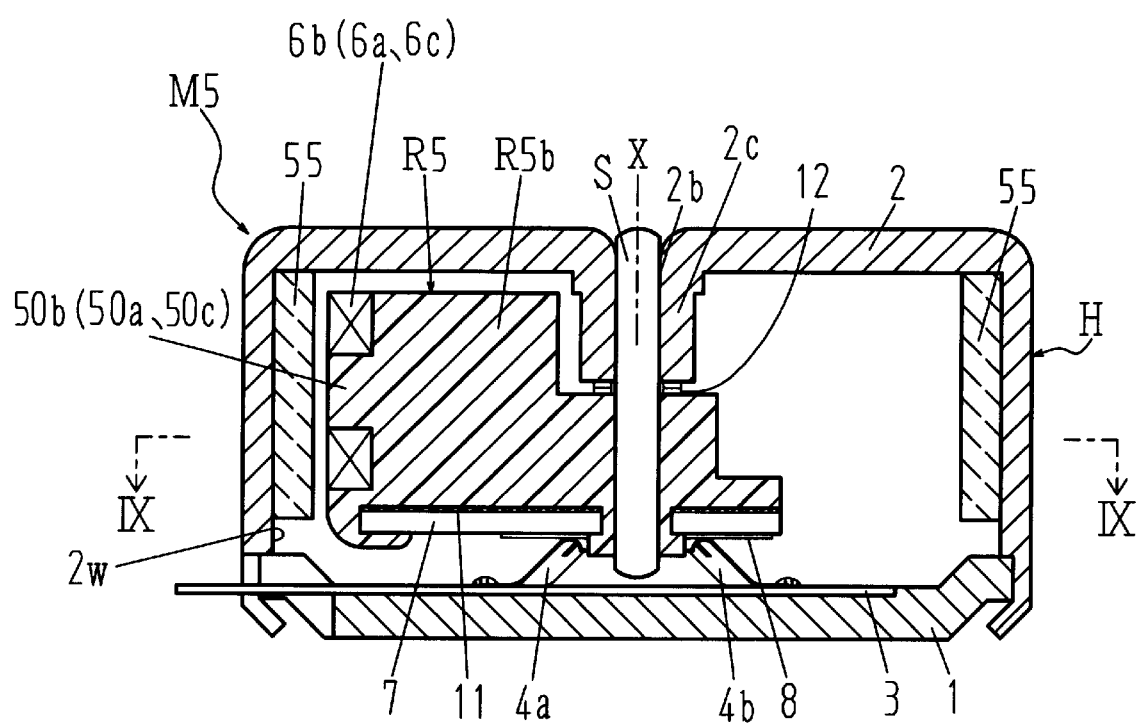
FIG. 8 is a vertical sectional view of a vibrator motor of the fifth embodiment according to the present invention along the rotational axis of the rotor thereof.
Figure 9:
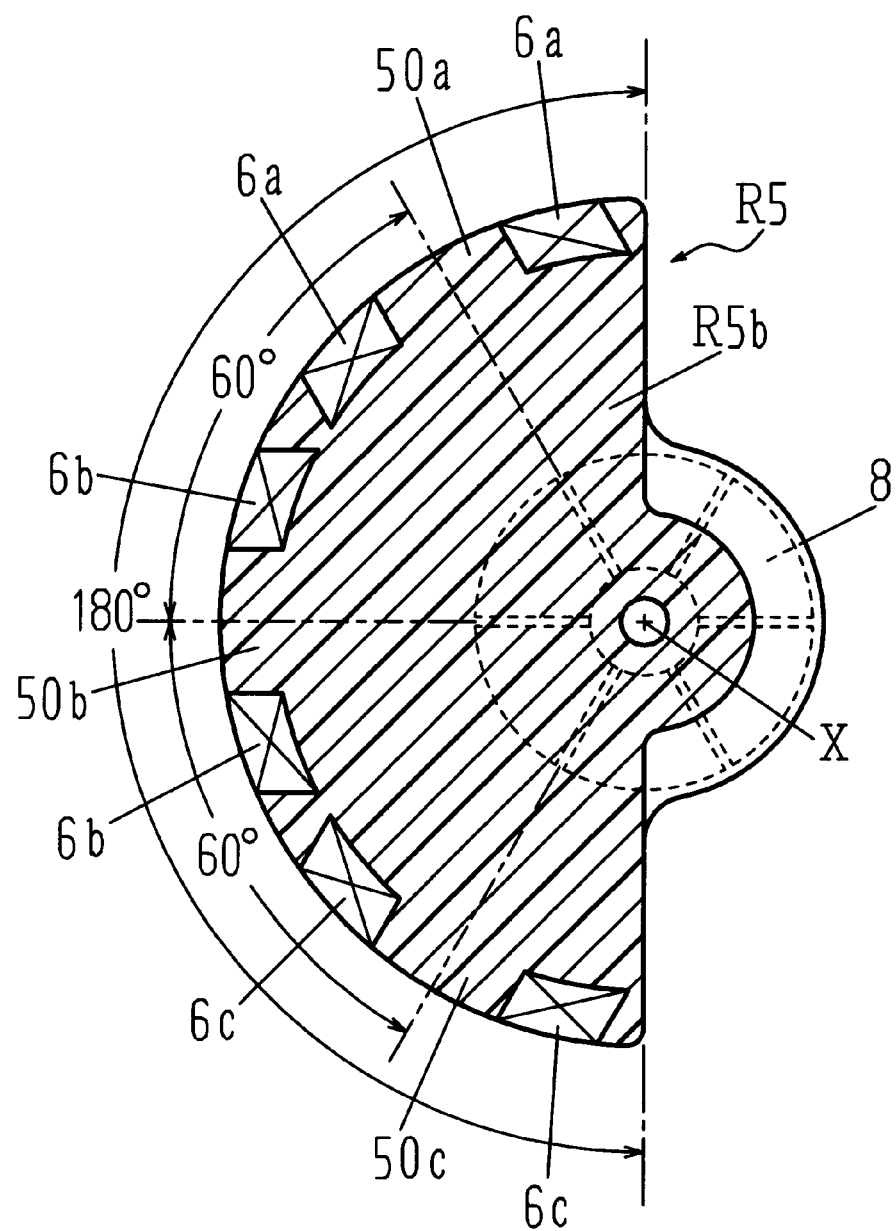
FIG. 9 is a horizontal sectional view of the rotor of the vibrator motor shown in FIG. 8.
Figure 10:
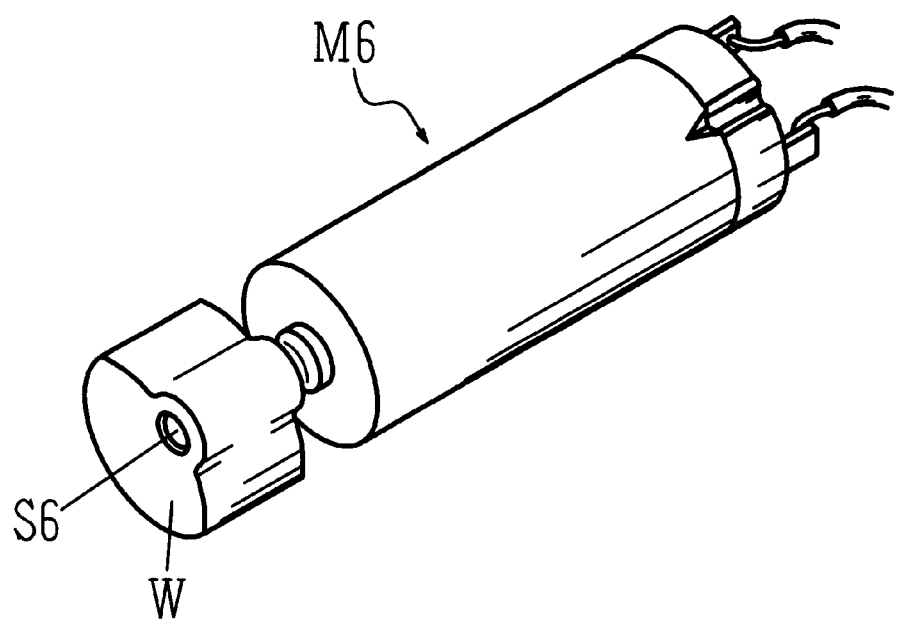
FIG. 10 is a perspective view of a conventional vibrator motor.

FIG. 8 is a vertical sectional view of a vibrator motor M5 of the fifth embodiment according to the present invention. The vibrator motor M5 has an eccentric armature rotor R5 that is disposed in the housing H and rotatably mounted on the shaft S that is fixedly supported by the housing H. FIG. 9 shows a horizontal section of the rotor R5 taken along lines IX—IX in FIG. 8 without showing any other parts shown in FIG. 8 besides the rotor R5.

The vibrator motor M5 has a toroidal permanent field magnet 55 that is fixedly attached to the inside side surface 2w of the top case 2 coaxially with the center axis X and disposed radially outside the rotor R5. The rotor R5 has an eccentric body R5b that is fixedly attached to the base plate 7 with the adhesive 11 and is in direct contact with the shaft S. The body R5b is made of the same low-friction type synthetic resin as of the first part 29 of the rotor body R2b of the second embodiment.

The magnet 55 is also divided into four arcuate alternate north and south pole sections at an even pitch angle of 90° about the center axis X, as in the case of the field magnets of the first to fourth embodiments.

The rotor R5 is disposed in the housing H and rotatably mounted on the shaft S. The three armature coils 6a, 6b and 6c are disposed in parallel with the center axis X flush with a radially outside perimeter of the body R5b partially embedded therein. The body R5b integrally has three core parts 50a, 50b and 50c disposed at an even pitch angle of 60° within a total angular range of 180° about the center axis X and the coils 6a, 6b and 6c are individually wound around the core parts 50a, 50b and 50c, respectively.

Other components and their functions of the vibrator motor M5 are identical to those of the vibrator motor M1 of the first embodiment.

Since the electromagnetic principle for the rotation of the rotors R2, R3, R4 and R5 of the vibrator motors M2, M3, M4 and M5, respectively, are exactly the same as that of the rotor R1 of the motor M1, as described above in reference to FIGS. 3A and 3B, no duplicate explanation will be made on such principle.

Since the vibrator motor of the present invention employs an eccentric generally sector-shaped rotor substantially weighted in its radially outer section with little addition to their radial dimension, their weight off-balance characteristics is greatly improved without adding its dimensions. The vibrator motor has neither external eccentric weight nor output shaft. The alerting device employing this motor can, therefore, be designed compact and without any danger of interference between the rotating parts and any other parts contained in the alerting device. Furthermore, since the rotor body including the core parts of all of the vibrator motors are made of nonmagnetic material undesirable cogging effect is substantially minimized.

It will be understood that various changes and modifications may be made in the above described embodiments which provide the characteristics of the present invention without departing from the spirit and principle thereof particularly as defined in the following claims.

What is claimed is:

1. A vibrator motor, comprising:
   (a) a housing;
   (b) a shaft supported by said housing, said shaft having a longitudinal center axis;
   (c) a toroidal permanent field magnet fixedly disposed inside said housing coaxially with said center axis, said field magnet having alternate north and south magnetic poles arranged at an even angular pitch about said center axis;
   (d) an eccentric armature rotor disposed in said housing and mounted on said shaft, said rotor having an eccentric nonmagnetic body, a plurality of armature coils arranged at an even pitch angle about said center axis, and a commutator disposed coaxially with said center axis, said body comprising a first part and a second part that is partially embedded in said first part, said first part integrally having a first coil retaining part and said second part integrally having a second coil retaining part, said second coil retaining part being disposed radially inside said first coil retaining part and radially outside said field magnet in a manner that said second coil retaining part opposes said field magnet leaving an airgap therebetween, said second coil retaining part integrally having core parts corresponding individually to said armature coils, said core parts being disposed at an even pitch angle within a 180° angular range about said center axis, said armature coils being arranged in a manner that said coils are individually wound around said core parts and sandwiched between said first coil retaining part and said second coil retaining part; and
   (e) a pair of resilient commutator brushes of opposite polarities disposed in said housing in contact with said commutator.

2. A vibrator motor according to claim 1, wherein said first part of said rotor body is made of a synthetic resin and said second part of said rotor body is made of a metal.

3. A vibrator motor according to claim 2, wherein said second part of said rotor body is made of a nonmagnetic electrically-conductive metal.

4. A vibrator motor according to claim 3, wherein said armature coils are electrically connected with one another in a star-connection having a neutral point that is electrically connected with said first part of said rotor body.

5. A vibrator motor according to claim 1, wherein said first part of said rotor body is made of a first synthetic resin and said second part of said rotor body is made of a second synthetic resin that is different from said first synthetic resin.

6. A vibrator motor according to claim 5, wherein a density of said first synthetic resin is less than a density of said second synthetic resin.

7. A vibrator motor according to claim 6, wherein said density of said first synthetic resin is less than 1.8 and said density of said second synthetic resin is greater than 3.0.

8. A vibrator motor according to claim 1, wherein said first part and said second part of said rotor body are both made of an identical synthetic resin.

9. A vibrator motor according to claim 8, wherein said synthetic resin has a density greater than 3.0.

10. A vibrator motor, comprising:
(a) a housing having a side circular inside wall;
(b) a shaft supported by said housing, said shaft having a longitudinal center axis;
(c) a toroidal permanent field magnet fixedly disposed inside said housing coaxially with said center axis, said field magnet having alternate north and south magnetic poles arranged at an even angular pitch about said center axis;
(d) an eccentric armature rotor disposed in said housing and mounted on said shaft, said rotor having an eccentric nonmagnetic body, a plurality of armature coils arranged at an even pitch angle about said center axis, and a commutator disposed coaxially with said center axis, said body comprising a first part and a second part that is partially embedded in said first part, said second part integrally having a coil retaining part that is disposed radially outside said field magnet leaving an airgap therebetween, said coil retaining part integrally having core parts and coil retaining flanges corresponding individually to said armature coils, each of said armature coils being individually wound on each of said core parts, said core parts being disposed at an even pitch angle and within a 180° angular range about said center axis, said coil retaining flanges having individually arcuate surfaces on radially outside thereof and said surfaces opposing said side circular inside wall of said housing; and
(e) a pair of resilient commutator brushes of opposite polarities disposed in said housing in contact with said commutator.

11. A vibrator motor according to claim 10, wherein said first part of said rotor body is made of a first synthetic resin said second part of said rotor body is made of a second synthetic resin that is different from said first synthetic resin.

12. A vibrator motor according to claim 11, wherein a density of said first synthetic resin is less than a density of said second synthetic resin.

13. A vibrator motor according to claim 12, wherein said density of said first synthetic resin is less than 1.8 and said density of said second synthetic resin is greater than 3.0.

14. A vibrator motor, comprising:
(a) a housing;
(b) a shaft fixedly supported by said housing, said shaft having a longitudinal center axis;
(c) a toroidal permanent field magnet fixedly disposed inside said housing coaxially with said center axis, said field magnet having alternate north and south magnetic poles arranged at an even angular pitch about said center axis;
(d) an eccentric armature rotor disposed in said housing and rotatably mounted on said shaft in a manner that said rotor is radially inside said field magnet, said rotor having an eccentric nonmagnetic body made of a synthetic resin that is in direct contact with said shaft, a base plate to which said body is fixedly attached, a plurality of armature coils and a commutator fixedly attached to said base plate and disposed coaxially with said center axis, at least parts of said coils being embedded in said body, said body integrally having a plurality of core parts arranged at an even pitch angle within a 180° angular range about said center axis corresponding individually to said coils so that said coils are individually wound around said core parts; and
(e) a pair of resilient commutator brushes of opposite polarities disposed in said housing in contact with said commutator.

* * * * *